United States Patent
Brüninghaus et al.

(10) Patent No.: US 11,231,813 B2
(45) Date of Patent: Jan. 25, 2022

(54) TOUCHSCREEN HAVING ELECTRO-OPTICAL DISPLAY AND INTEGRATED PRESSURE SENSING

(71) Applicant: Continental Automotive GmbH, Hannover (DE)

(72) Inventors: Andreas Brüninghaus, Wiehl (DE); Kai Hohmann, Babenhausen (DE); Steffen Wildner, Dieburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/908,230

(22) Filed: Jun. 22, 2020

(65) Prior Publication Data
US 2020/0319732 A1   Oct. 8, 2020

Related U.S. Application Data

(63) Continuation of application No. PCT/EP2018/084872, filed on Dec. 14, 2018.

(30) Foreign Application Priority Data

Dec. 22, 2017 (DE) ..................... 10 2017 223 731.7

(51) Int. Cl.
*G06F 3/042* (2006.01)
*G06F 3/041* (2006.01)
*G06F 3/044* (2006.01)

(52) U.S. Cl.
CPC .............. *G06F 3/042* (2013.01); *G06F 3/044* (2013.01); *G06F 3/0414* (2013.01); *G06F 2203/04102* (2013.01)

(58) Field of Classification Search
CPC . G06F 2203/04102; G06F 2203/04105; G06F 3/0414; G06F 3/042; G06F 3/044
See application file for complete search history.

(56) References Cited

U.S. PATENT DOCUMENTS

| 2008/0062148 A1 | 3/2008 | Hotelling et al. |
| 2009/0205437 A1* | 8/2009 | Dallenbach ............. G01L 1/142 73/780 |

(Continued)

FOREIGN PATENT DOCUMENTS

WO   2017/190388 A1   11/2017

OTHER PUBLICATIONS

Search Report dated Aug. 9, 2018 from corresponding German Patent Application No. DE 10 2017 223 731.7.

(Continued)

*Primary Examiner* — Hong Zhou

(57) ABSTRACT

In an electro-optical touchscreen inputs into an electronic system are able to be realized by the electro-optical touchscreen being touched by an input member and wherein the electro-optical touchscreen comprises a display and a first sensing device for determining the location at which the electro-optical touchscreen is touched, and a second sensing device for determining a force applied to the electro-optical touchscreen, wherein the position of the electro-optical touchscreen with respect to a reference surface is variable by way of the force being applied to the surface of said electro-optical touchscreen, wherein the second sensing device is configured in capacitive fashion and comprises an electrode, it is provided that the electrode of the second sensing device lies in a plane with electrodes of the display or in a plane with electrodes of the first sensing device.

12 Claims, 1 Drawing Sheet

(56) References Cited

U.S. PATENT DOCUMENTS

| | | |
|---|---|---|
| 2010/0024573 A1 | 2/2010 | Daverman et al. |
| 2010/0253645 A1 | 10/2010 | Bolender |
| 2011/0148811 A1 | 6/2011 | Kanehira et al. |
| 2011/0227872 A1* | 9/2011 | Huska .................... H01H 13/85 |
| | | 345/174 |
| 2011/0248952 A1* | 10/2011 | Wang .................... G06F 3/0444 |
| | | 345/174 |
| 2015/0272455 A1* | 10/2015 | Krasnov ............ A61B 5/02241 |
| | | 600/490 |
| 2016/0103544 A1 | 4/2016 | Filiz et al. |
| 2017/0090593 A1* | 3/2017 | Cao ...................... G06F 1/1681 |
| 2017/0293377 A1 | 10/2017 | Hsu et al. |
| 2018/0113542 A1 | 4/2018 | Cao et al. |
| 2018/0308325 A1* | 10/2018 | Takeda ...................... G06F 3/01 |

OTHER PUBLICATIONS

International Search Report and Written Opinion dated Mar. 4, 2019 from corresponding International Patent Application No. PCT/EP2018/084872.

* cited by examiner

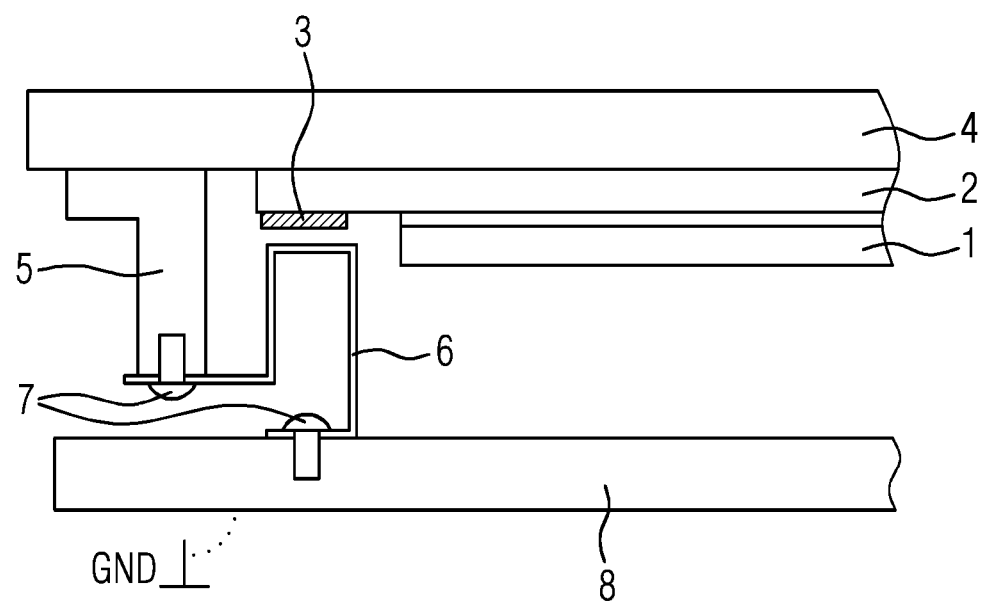

TOUCHSCREEN HAVING ELECTRO-OPTICAL DISPLAY AND INTEGRATED PRESSURE SENSING

CROSS-REFERENCE TO RELATED APPLICATIONS

This U.S. patent application claims the benefit of PCT patent application No. PCT/EP2018/084872, filed Dec. 14, 2018, which claims the benefit of German patent application No. 10 2017 223 731.7, filed Dec. 22, 2017, both of which are hereby incorporated by reference.

TECHNICAL FIELD

The invention relates to an electro-optical touchscreen.

BACKGOUND

The prior art discloses touchscreens in which by means of the touchscreen inputs into an electronic system are able to be realized by the touchscreen being touched by means of an input member and wherein the touchscreen comprises a display and a first sensing device for determining the location at which the touchscreen is touched, and a second sensing device for determining a force applied to the touchscreen. The position of the touchscreen with respect to a reference surface is variable by way of the force being applied to the surface of said touchscreen.

In this case, the second sensing device is used in order to be able to ascertain reliable touching of the touchscreen. In this case, the second sensing device can be configured as a capacitive sensor in which a change in the position of two electrodes of a capacitor with respect to one another results in a change in the capacitance of the capacitor and, by measuring the capacitance of the capacitor, it is possible to deduce the corresponding change in the position of the electrodes with respect to one another and thus reliably identified touching of the touchscreen by an input member.

The parts of the capacitors which are known from the prior art are embodied as discrete components which have to be mounted separately in relation to the other components of the components required for the touchscreen. This additional mounting requires additional spatial and temporary expenditure. Therefore, it is desirable to reduce this as much as possible.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

As disclosed herein an electrode of the second sensing device lies in a plane with electrodes of the display or in a plane with electrodes of the first sensing device to reduce the mounting requirements of the sensing element. As a result, the electrode of the sensing device can easily be arranged together with the electrodes of the display or with the electrodes of the first sensing device.

Additionally, the electrode of the second sensing device may be produced together with the electrodes of the display or electrodes of the first sensing device. As a result, hardly any additional costs arise.

If the touchscreen comprises a spring element, it can be held in a defined position and nevertheless be moved relative to a reference surface.

If the spring element comprises a leaf spring, it is possible to realize a functional spring element which is constructed in a simple manner and which moreover permits movements in certain directions and suppresses other directions.

If the leaf spring is offset, the degrees of freedom of the directions of movement of the touchscreen can be defined easily and simply.

In as much as the leaf spring or the leaf springs is or are offset, the leaf spring can be arranged at a distance from the electrode of the second sensing device, wherein the distance is chosen such that it turns out to be as small as possible without the spring element and the electrode of the second sensing device touching one another. In this regard, the spring element can be used as a second electrode of the sensing device and thus a separate second electrode of the respective second sensing device is not required and thus a capacitor is formed, from the respective capacitance of which the distance between the electrode of the second sensing device and the spring element can be deduced.

Said second sensing device can also operate if the leaf spring is offset multiply, particularly if it comprises two approximately parallel sections and the connection of these two parallel sections is at the shortest distance of the leaf spring from the electrode of the second sensing device.

Other spring elements can also be chosen in order to be able to cooperate electronically with the electrode of the second sensing device. Moreover, it is possible to provide additional separate electrodes which can form a capacitor with the electrodes of the second sensing device.

The electrical connection of the spring element to a ground potential can be produced in a simple manner if the touchscreen comprises a metallic housing or housing provided with a metallic coating and the spring element is electrically connected to the housing and housing is at ground potential. This electrical connection can simultaneously also constitute the mechanical connection of the spring element to the housing. By way of example, the spring element can be connected to the housing in a positively locking manner or cohesively.

The electrode of the second sensing device can be connected to an evaluation unit via a flexible conductor, in particular a flexible printed circuit board, in which evaluation unit the data of the first sensing device are processed as well.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows a sectional drawing of an exemplary touchscreen and electro-optical display.

DETAILED DESCRIPTION

The following description of the preferred embodiment(s) is merely exemplary in nature and is in no way intended to limit the invention, its application, or uses. Identical elements or elements of the same type or with equivalent actions may be denoted by the same reference signs throughout the FIGURES.

The FIGURE reveals in partial sectional view a display 1, a touch film 2 of the first sensing device with the electrode 3 of the second sensing device, a cover glass 4, a securing frame 5, a leaf spring 6, screws 7 and a housing 8.

The display 1 is embodied as an electro-optical display in the form of an LCD or OLED, for example. The touch film 2 of the first sensing device is fitted on said display, wherein the touch film 2 additionally has an electrode 3 of the second sensing device, which is arranged at a distance from the leaf spring 6, and the leaf spring 6 thus forms a capacitor, in particular with a section of the leaf spring 6 which is situated between the virtually parallel sections of the leaf spring 6. The electrode 3 can be produced simultaneously with the touch film 2, which reduces the production costs and mounting costs overall.

The leaf spring 6 is connected to the securing frame and the housing 8 by way of the screws 7 and is thus electrically grounded, as is illustrated by the ground symbol GND.

The cover glass 4 protects the touch film 2 and the display 1 against environmental influences and improves the visual appearance of the touchscreen. The cover glass 4 can be partly printed in order to conceal the securing frame 5, for example. In the example illustrated, only the cover glass 4 is connected to the securing frame. In this regard, the illustrated capacitor consisting of electrode 3 and leaf spring 6 can be realized.

If the display 1 is intended to be positioned nearer to the securing frame 5, it may be possible to configure the electrode 3 as part of the rear electrodes (not illustrated in the exemplary embodiment) of the display 1.

If an operator of the touchscreen approaches the cover glass 4 with an operating member such as a finger or stylus, for example, the position at which the input member is situated on the surface of the touchscreen is identified by way of the touch film 2 of the first sensing device. If the operating member presses onto the surface of the cover glass 4, the leaf spring 6 yields, such that the electrode 3 approaches the leaf spring and the capacitance of the capacitor consisting of the electrode 3 and the leaf spring 6 thus increases and a pressure on the cover glass 4 can thus be detected. Since the distance between the leaf spring 6 and the electrode 3, and thus the capacitance of the capacitor consisting of electrode 3 and leaf spring 6, changes depending on the force applied to the cover glass 4, the force applied to the cover glass 4 can also be determined in an evaluation unit (not illustrated).

The touchscreen comprises a plurality of electrodes 3 and leaf springs 6 or, to put it more generally, elastic elements. The elastic elements can also be configured as a spiral spring, for example.

A pressure on the cover glass thus changes the distance between the cover glass and the housing 8 as reference surface.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. An electro-optical touchscreen, comprising:
   at least one input of the electro-optical touchscreen, wherein the at least one input into an electronic system are able to be realized by the electro-optical touchscreen being touched;
   a display having a plurality of display electrodes;
   a first sensing device having a plurality of first electrodes for determining a location at which the electro-optical touchscreen is touched;
   a second sensing device for determining a force applied to the electro-optical touchscreen from the touch, wherein the second sensing device is capacitive and comprises at least one second electrode;
   a reference surface having a variable position to a surface of said electro-optical touchscreen based on the force being applied when the electro-optical touchscreen is touched; and
      wherein the at least one second electrode lies in a plane with one of the display electrodes and at least one of the plurality of first electrodes;
   a leaf spring, and wherein the leaf spring has a first end and a second end which are offset in a horizontal direction and a vertical direction from one another.

2. The electro-optical touchscreen as claimed in claim 1, wherein the at least one second electrode s produced together with the one of the display electrodes and the plurality of first electrodes.

3. The electro-optical touchscreen as claimed in claim 1, wherein the leaf spring is offset multiply.

4. The electro-optical touchscreen as claimed in claim 3, wherein the leaf spring comprises two approximately parallel sections.

5. The electro-optical touchscreen as claimed in claim 1, wherein the leaf spring is arranged a distance from the electrode of the second sensing device.

6. The electro-optical touchscreen as claimed in claim 5, wherein the touchscreen comprises a housing.

7. The electro-optical touchscreen as claimed in claim 6, wherein the housing consists of metal or is provided with a metallic coating, and the leaf spring is electrically connected to the housing.

8. The electro-optical touchscreen as claimed in claim 1, wherein the at least one second electrode is connected to an evaluation unit via flexible electrical connections.

9. The electro-optical touchscreen as claimed in claim 8, wherein the flexible electrical connections are embodied as a flexible printed circuit board.

10. The electro-optical touchscreen as claimed in claim 8, wherein signals generated by the at least one second electrode are processed in the evaluation unit, in which data of the first sensing device are processed as well.

11. The electro-optical touchscreen as claimed in claim 1, wherein the leaf spring further comprises a middle section and wherein the middle section is offset from the first end and the second end in at least one of the horizontal and vertical direction.

12. The electro-optical touchscreen as claimed in claim 11, wherein the middle section of the leaf spring is arranged at a distance from the at least one second electrode to form the second sensing device.

* * * * *